United States Patent
Kriss et al.

(10) Patent No.: US 8,140,977 B2
(45) Date of Patent: Mar. 20, 2012

(54) HOSTED DATA VISUALIZATION SERVICE

(75) Inventors: Jesse H. Kriss, Cambridge, MA (US);
Franciscus J. J. van Ham, Cambridge, MA (US); Fernanda B. Viegas, Boston, MA (US); Martin M. Wattenberg, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 11/770,432

(22) Filed: Jun. 28, 2007

(65) Prior Publication Data
US 2009/0007010 A1    Jan. 1, 2009

(51) Int. Cl.
*G06F 13/00* (2006.01)
*G06F 15/00* (2006.01)

(52) U.S. Cl. ....................... 715/738; 715/734
(58) Field of Classification Search .......... 715/763–765, 715/851–853, 740–745, 734–738, 749, 850, 715/854
See application file for complete search history.

(56) References Cited

U.S. PATENT DOCUMENTS

| | | | |
|---|---|---|---|
| 6,529,900 B1* | 3/2003 | Patterson et al. | 1/1 |
| 2005/0267760 A1* | 12/2005 | Meyer et al. | 704/270.1 |
| 2007/0244783 A1* | 10/2007 | Wright et al. | 705/35 |

* cited by examiner

*Primary Examiner* — Cao "Kevin" Nguyen
(74) *Attorney, Agent, or Firm* — Steven M. Greenberg, Esq.; Carey, Rodriguez, Greenberg & O'Keefe

(57) ABSTRACT

A hosted data visualization data processing system can be provided. The system can include a host computing platform configured for communicative coupling to remote clients over a computer communications network. In this regard, each of the remote clients can include a data set. The system further can include a data visualization processor in the host computing platform and a hosted data visualization service coupled to the data visualization processor. The service can include program code enabled to receive a data subset from a requesting one of the remote clients based upon a corresponding data set stored in the requesting one of the remote clients, to generate a data visualization for the data subset and to transmit the generated data visualization over the computer communications network to the requesting one of the remote clients for rendering in the requesting one of the remote clients.

15 Claims, 1 Drawing Sheet

HOSTED DATA VISUALIZATION SERVICE

BACKGROUND OF THE INVENTION

1. Field of the Invention

The present invention relates to the field of data reduction computing systems and more particularly to data visualization for data reduction.

2. Description of the Related Art

Database management systems have fueled the utility of computing for a substantial portion of end users for many decades. Conventional database management systems allow for the structured storage of mass quantities of data and also conventional database management systems provide an interface through which the data can be sorted, filtered and queried. The manipulation of stored data in a database management system provides the end user with unlimited ways to relate data so as to intelligently analyze the context and meaning of the stored data in manner not previously possible when analyzing data on paper without the assistance of a computer.

For some database management systems holding only a limited number of data types in each record, data can only be related to one another in so many ways such that the manipulation of stored data afforded by the database management system can suffice in facilitating a competent reduction of the data. Strictly speaking, data acquisition refers to the collection and storage of data in a database management system, while data reduction refers to the analysis of data in a database management system to apply meaning to the collected and stored data. Integral to the modern data reduction process, data, data visualization further facilitates a mental understanding of the interrelationship between different types of data stored in a database management system.

Data visualization is a technique that allows a user of a database system to view information about data stored in the database along different dimensions. The data visualizations that are created to display the information can take on various forms. One typical form is that of a table layout, with each row representing a record in the database and each column representing a field from the record. The table usually lists a subset of the database records and a subset of the available fields in the database records. Furthermore, the table can be ordered as an aid to navigation. A general overview of data visualization can be found in U.S. Pat. No. 6,529,900 to Patterson et al. for METHOD AND APPARATUS FOR DATA VISUALIZATION issued on Mar. 4, 2003.

Data visualization requires the use of complex tools arranged to interact with an underlying database management system. Installing a data visualization tool can be challenging for many end users and requires the intervention by trained information technologists. Yet further, configuring a data visualization tool for interoperability with an underlying database management system can be a daunting affair, also requiring the expertise of a trained information technologist or team of trained information technologists. Accordingly, for many end users the benefit of data visualization remains out of reach.

BRIEF SUMMARY OF THE INVENTION

Embodiments of the present invention address deficiencies of the art in respect to data visualization in data reduction computing systems and provide a novel and non-obvious method, system and computer program product for hosted data visualization. In one embodiment of the invention, a hosted data visualization data processing system can be provided. The system can include a host computing platform configured for communicative coupling to remote clients over a computer communications network. In this regard, each of the remote clients can include a data set. The system further can include a data visualization processor in the host computing platform and a hosted data visualization service coupled to the data visualization processor.

The service can include program code enabled to receive a data subset from a requesting one of the remote clients based upon a corresponding data set stored in the requesting one of the remote clients, to generate a data visualization for the data subset and to transmit the generated data visualization over the computer communications network to the requesting one of the remote clients for rendering in the requesting one of the remote clients. Also, in selectable data visualization types can be coupled to the data visualization processor so that the program code of the hosted data visualization service can be further enabled to provide an interface for selecting one of the selectable data visualization types for the data subset. Yet further, the program code of the hosted data visualization service can be enabled to assign different attributes of the data subset to different dimensions of a selected one of the selectable data visualization types for the data subset.

In another embodiment of the invention, a hosted data visualization method can be provided. The method can include receiving a data subset from over a computer communications network from a requesting remote client based upon a corresponding data set stored in the requesting remote client, generating a data visualization for the data subset, and transmitting the generated data visualization over a computer communications network to the requesting remote client for rendering in the requesting remote client. Transmitting the generated data visualization over a computer communications network to the requesting remote client for rendering in the requesting remote client further can include transmitting a logic script for execution in a content browser in the remote client to enable navigation of the generated data visualization in the content browser of the remote client.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for hosted data visualization. In accordance with an embodiment of the present invention, a requesting viewer can provide a subset of data over a computer communications network to a hosted data visualization service. A data visualization for the subset can be selected and configured for different attributes of the subset and a data visualization can be generated for the subset. Finally, the data visualization can be returned over the computer communications network for rendering in a viewer. Optionally, the data visualization can be interactive so as to respond to user navigation commands to navigate the data visualization.

Figure 1:
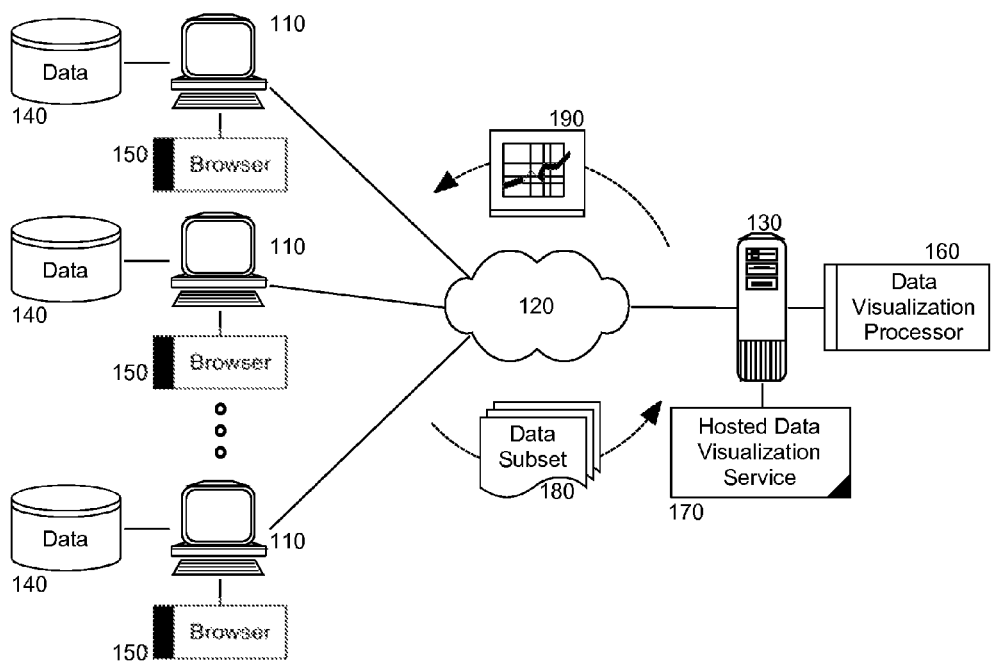
FIG. 1 is a schematic illustration of a hosted data visualization data processing system; and, FIG. 2 is a flow chart illustrating a process for hosted data visualization.

In further illustration, FIG. 1 schematically depicts a hosted data visualization data processing system. The system can include a host computing platform 130 communicatively coupled to one or more remote clients 110 over computer communications network 120. The host computing platform 130 can support the operation of a data visualization processor 160 configured for data visualization of data sets provided as input to the data visualization processor 160. The data visualization can be configured according a number of visualizations, including 2-D and 3-D graphing, scatter plotting, bar graphing, pie charting, hierarchical tree mapping, network generation, and the like so as to transform tabular data into one or more of the visualizations. Moreover, different attributes or of the data set can be mapped to different dimensions of the data visualization to provide different viewpoints for analyzing the data set.

Each of the remote clients 110 can include at least one data set 140 and a content browser 150. The data set 140 can include multiple attributes. In the context of a database, the data set 140 can include one or more multi-field records, each field corresponding to a different attribute. The content browser 150 in turn can be configured to render markup language documents such as Web pages, and also the content browser 150 can be configured to support the local execution of remotely provided logic, for example Java™ language applets or other types of dynamic scripts. To that end, the content browser 150 can be enabled to access a hosted data visualization service 170 coupled to the host computing platform 130 from over the computer communications network 120.

The hosted data visualization service 170 can include program code enabled to receive a data subset 180 of the data set 140 through the content browser 150. The program code of the hosted data visualization service 170 further can be enabled to provided the data subset 180 to the data visualization processor 160 for creating a data visualization for the data subset 180. To that end, the program code of the hosted data visualization service 170 yet further can be enabled to permit a selection of a data visualization type, and also to permit a specification of attributes of the data subset 180 for assignment to corresponding dimensions of a generated data visualization of the selected data visualization type.

Figure 2:
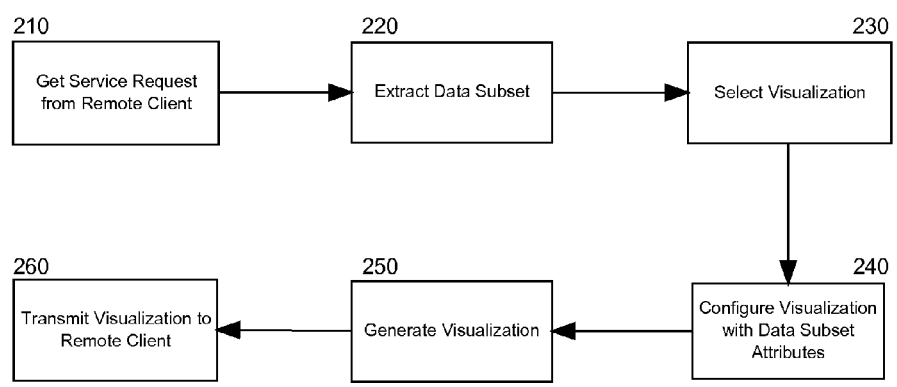

In yet further illustration, FIG. 2 is a flow chart illustrating a process for hosted data visualization. The process can begin in block 210 with the receipt of a data visualization service request from a remote client. In block 220, a data subset can be received from the remote client. Thereafter, in block 230, a visualization type can be selected for visualizing the data subset. Likewise, in block 240, different dimensions of the selected visualization can be mapped to different attributes of the data subset, for example, by assigning dimensions like axes, colors, textures, shapes and the like to different attributes of the data subset. Subsequently, in block 250 a visualization can be generated for the data subset and the visualization can be transmitted to the remote client in block 260 in which the visualization can be navigated.

In particular, to the extent that the visualization is rendered in an executing script or applet, the visualization can be navigated remotely in the client though the visualization is initially generated in a server environment. In this way, data visualization of data subsets can be produced as a service to a multiplicity of end users. However, the end users need not invest time and resources in acquiring the requisite software to produce data visualizations. More importantly, the end users need not invest effort in a professional technology staff to configure data visualization tools for interoperability with a supporting data source.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A hosted data visualization data processing system comprising:

a host computing platform configured for communicative coupling to a plurality of remote clients over a computer communications network, each of the remote clients comprising a data set;

a data visualization processor in the host computing platform;

a hosted data visualization service coupled to the data visualization processor, the service comprising program code enabled to receive a data subset from a requesting one of the remote clients based upon a corresponding data set stored in the requesting one of the remote clients, to generate a data visualization for the data subset and to transmit the generated data visualization over the computer communications network to the requesting one of the remote clients for rendering in the requesting one of the remote clients.

2. The system of claim 1, wherein the requesting one of the remote clients comprises a content browser configured to support an executing logic script provided by the hosted data visualization service, the logic script being programmed to navigate the generated data visualization.

3. The system of claim 1, further comprising a plurality of selectable data visualization types coupled to the data visualization processor, the program code of the hosted data visualization service being further enabled to provide an interface for selecting one of the selectable data visualization types for the data subset.

4. The system of claim 3, wherein the program code of the hosted data visualization service is yet further enabled to assign different attributes of the data subset to different dimensions of a selected one of the selectable data visualization types for the data subset.

5. The system of claim 1, wherein the generated data visualization is a transformation of tabular data to one of a 2-D graph, a 3-D graph, a scatter plot, a hierarchical tree, a network, a bar graph and a pie chart.

6. A hosted data visualization method comprising:
   receiving a data subset from over a computer communications network from a requesting remote client based upon a corresponding data set stored in the requesting remote client;
   generating a data visualization for the data subset; and,
   transmitting the generated data visualization over a computer communications network to the requesting remote client for rendering in the requesting remote client.

7. The method of claim 6, wherein generating a data visualization for the data subset comprises generating a data visualization to transform tabular data to one of a 2-D graph, a 3-D graph, a scatter plot, a hierarchical tree, a network, a bar graph and a pie chart.

8. The method of claim 6, wherein transmitting the generated data visualization over a computer communications network to the requesting remote client for rendering in the requesting remote client, further comprises transmitting a logic script for execution in a content browser in the remote client to enable navigation of the generated data visualization in the content browser of the remote client.

9. The method of claim 6, further comprising selecting a data visualization type from amongst a plurality of data visualization types for use when generating the data visualization for the data subset.

10. The method of claim 9, further comprising assigning different attributes of the data subset to different dimensions of a selected data visualization type for the data subset.

11. A computer program product comprising a computer usable medium embodying computer usable program code for hosted data visualization, the computer program product comprising:
   computer usable program code for receiving a data subset from over a computer communications network from a requesting remote client based upon a corresponding data set stored in the requesting remote client;
   computer usable program code for generating a data visualization for the data subset; and,
   computer usable program code for transmitting the generated data visualization over a computer communications network to the requesting remote client for rendering in the requesting remote client.

12. The computer program product of claim 11, wherein the computer usable program code for generating a data visualization for the data subset comprises computer usable program code for generating a data visualization to transform tabular data to one of a 2-D graph, a 3-D graph, a scatter plot, a hierarchical tree, a network, a bar graph and a pie chart.

13. The computer program product of claim 11, wherein the computer usable program code for transmitting the generated data visualization over a computer communications network to the requesting remote client for rendering in the requesting remote client, further comprises computer usable program code for transmitting a logic script for execution in a content browser in the remote client to enable navigation of the generated data visualization in the content browser of the remote client.

14. The computer program product of claim 11, further comprising computer usable program code for selecting a data visualization type from amongst a plurality of data visualization types for use when generating the data visualization for the data subset.

15. The computer program product of claim 14, further comprising computer usable program code for assigning different attributes of the data subset to different dimensions of a selected data visualization type for the data subset.

* * * * *